(No Model.)
A. R. ISAACS.
FIRE BOX AND GRATE FOR RANGES, STOVES, OR HEATERS.
No. 518,457. Patented Apr. 17, 1894.
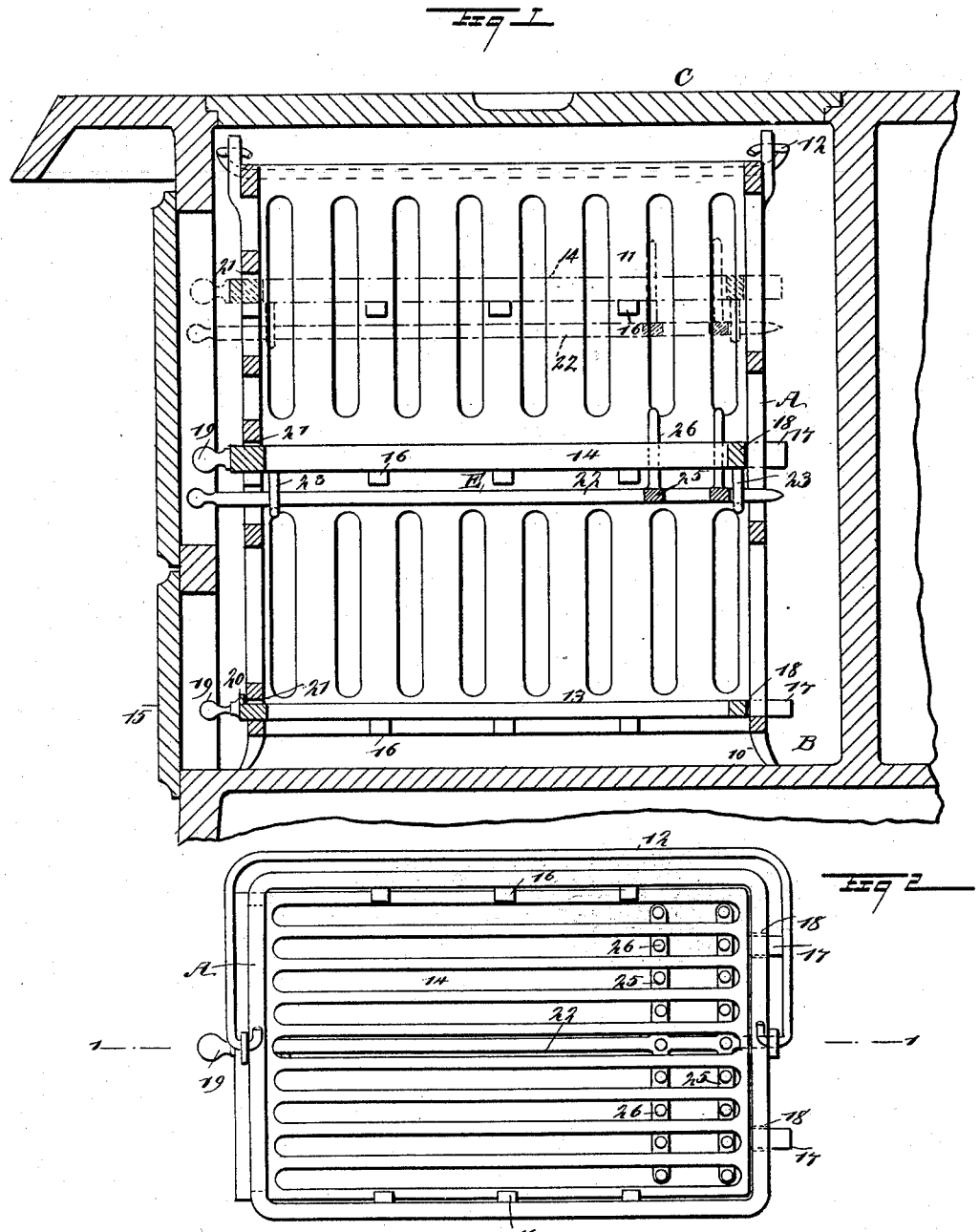
WITNESSES:
H. Walker
C. Sedgwick
INVENTOR
A. R. Isaacs
BY Munn & Co
ATTORNEYS.

UNITED STATES PATENT OFFICE.

AUGUSTA R. ISAACS, OF NEW YORK, N. Y.

FIRE-BOX AND GRATE FOR RANGES, STOVES, OR HEATERS.

SPECIFICATION forming part of Letters Patent No. 518,457, dated April 17, 1894.

Application filed June 28, 1893. Serial No. 479,062. (No model.)

*To all whom it may concern:*

Be it known that I, AUGUSTA R. ISAACS, of New York city, in the county and State of New York, have invented a new and Improved Fire-Box and Grate for Ranges, Stoves, or Heaters, of which the following is a full, clear, and exact description.

My invention relates to an improvement in the fire pots and grates of stoves, ranges and heaters, and it has for its object to construct a fire pot adapted to be introduced into the regular fire pot of a stove, range or heater to which the application is to be made, the fire being adapted to be made in the auxiliary fire pot. The auxiliary fire pot thereby serves to protect the fire bricks in the main fire pot of the stove.

Another object of the invention is to so construct the fire pot that it may rest upon the bottom of the ash pit of the stove, and may be entirely removed from the ash pit in a convenient and expeditious manner when desirable.

Another feature of the invention consists in providing the auxiliary fire pot with two grates, one or both of which may be removed, one of the grates being located at the lower portion of the fire pot and constituting the bottom thereof, the other grate being located between the bottom and the top, thus providing for a greater or a less amount of fuel in the fire pot.

Another feature of the invention is to provide one or both of the grates with a rake attachment, whereby the bed of coals or the bed of fire may be shaken when necessary.

The invention consists in the novel construction and combination of the several parts, as will be hereinafter fully set forth and pointed out in the claim.

Reference is to be had to the accompanying drawings, forming a part of this specification, in which similar figures and letters of reference indicate corresponding parts in both the views.

Figure 1 is a vertical central section taken through the ash pit and fire pot of a stove, and likewise centrally through the auxiliary fire pot located within the said main fire pot of the stove, the section being taken practically on the line 1—1 of Fig. 2; and Fig. 2 is a plan view of the auxiliary fire pot removed from the stove.

In carrying out the invention the auxiliary fire pot A is made preferably of metal, and may be given any desired cross sectional shape; as for example it may be rectangular or circular in cross section, or may be made in any shape in which the main fire pot of a range, stove or heater is constructed.

The auxiliary fire pot A, is of sufficient length to extend practically from the bottom of the ash pit B of the stove to a point immediately beneath and practically close to the stove lid or lids C, as shown in Fig. 1; and ordinarily the fire pot is provided with legs 10, which rest upon the bottom of the ash pit and thus hold the bottom of the auxiliary fire pot a proper distance above the bottom of the ash pit to admit of a current of air beneath the grate or through the bottom of the pot.

The auxiliary fire pot is preferably constructed of a series of bars 11, which may extend vertically or horizontally as in practice may be found most desirable; or a portion of the bars may be vertically located while others may be horizontally placed; but preferably the bars are produced at each side of the center of the auxiliary pot, as shown in Fig. 1, leaving practically a solid section at its central portion. The upper portion of the auxiliary fire pot is provided with a bail 12, which is folded upon the side of the pot when it is located in a stove or range, the bail serving as a means for withdrawing the auxiliary pot from the stove or range when it is not needed.

The auxiliary fire pot is usually provided with two grates, a lower grate 13 and an upper one 14. The lower grate constitutes practically the bottom of the auxiliary fire pot, and when not desired may be drawn entirely out from the fire pot, for example through the opening closed by the ash pit door 15 of the stove. The upper grate 14, is likewise removable, and both of the grates are preferably supported in position by resting upon lugs 16, formed upon the sides of the auxiliary fire pot; and the grates are themselves provided with lugs 17, preferably located at their rear portions, which lugs enter and pass through openings 18, made for example in the back of the auxiliary fire pot to receive said lugs.

The grates are provided with suitable knobs or handles 19, at their front portions, and also preferably with a flange or flanges 20, likewise located at the front and adapted to cover the openings 21 made in the front of the auxiliary fire pot through which the grates are entered, as shown also in Fig. 1.

All of the grates, or only one of them, if desired, may be provided with a raking attachment E. This raking attachment preferably comprises a bar 22, which is located for example beneath the central portion of the grate, and is supported by means of suitable hangers 23, extending downward from the grate, which bar is provided with two or more cross bars 25, usually located at the rear portion of the main bar 22, as shown in Fig. 2; and from the cross bars a series of fingers 26, is projected upward, which fingers are adapted to enter the spaces between the bars of the grate. Thus it will be observed that the raking attachment is practically a fixture upon the grate, and that when the fire is to be stirred, by reciprocating the main bar 22 of the rake the fingers will be drawn through the bed of coals and will loosen the coal and sift downward the ashes.

In Fig. 1, I have illustrated one of the grates as located at the center of the auxiliary pot and the second as located at the bottom, while a third set of lugs 16, is located above the intermediate set and a third front opening 21, is illustrated above the intermediate opening, and a third grate is shown in dotted lines as being supported by the upper set of lugs. In practice, however, two grates only are necessary, as when a medium fire only is required the intermediate grate is placed in position and the lower grate may likewise be placed in the pot. The fire is built upon the intermediate grate, and if subsequently a much heavier fire is needed the intermediate grate may be drawn entirely out from the auxiliary fire pot and the coals dumped upon the lower grate, and it will then be observed that the entire capacity of the auxiliary fire pot may be employed to receive fuel. If however, a small or temporary fire is needed, simply to warm an article or to hastily prepare a meal, one of the grates may be placed in the uppermost position shown in dotted lines, and it will then be observed that but little fuel will be required to produce a hasty and fierce fire if necessary. By means of this auxiliary fire pot great economy of fuel is obtained, as the depth of the fire pot may be regulated according to the amount of fire required. The auxiliary fire pot is exceedingly simple, it is durable and it may be readily placed in the main fire pot of any stove, furnace or range to which such application is desired; and furthermore, I desire it to be understood that the bottom grate need not be placed as low down as shown in the drawings; in fact, the location of the grates will be entirely controlled by the character of the stove, range or furnace to which the application is made.

It will be understood that the ordinary grate of the stove, range or furnace is removed before the auxiliary fire pot is placed in position; and it will be likewise observed that the auxiliary fire pot will preserve the fire brick of the main fire pot intact.

Having thus described my invention, I claim as new and desire to secure by Letters Patent—

An improved removable fire pot for stoves, consisting of a grated like body or shell, having a series of lugs 16 arranged in different horizontal planes, a grate section adapted to be slid horizontally into the shell, and to rest at its sides on such lugs, said grate having depending hangers 23, and a raker member, held for horizontal reciprocation in such hangers, and formed with rake fingers 26, held to project through the horizontal grate bars, all arranged substantially as shown and for the purposes described.

AUGUSTA R. ISAACS.

Witnesses:
J. FRED. ACKER,
C. SEDGWICK.